United States Patent [19]

Io

[11] Patent Number: 5,022,505
[45] Date of Patent: Jun. 11, 1991

[54] ONE-WAY CLUTCH FOR TRANSMITTING ONLY ROTATION OF FIRST MEMBER TO SECOND MEMBER

[75] Inventor: Shinichi Io, Kanagawa, Japan

[73] Assignee: Atsugi Unisia Corporation, Kanagawa, Japan

[21] Appl. No.: 429,004

[22] Filed: Oct. 30, 1989

[30] Foreign Application Priority Data

Oct. 28, 1988 [JP] Japan .................. 63-272803
Nov. 11, 1988 [JP] Japan ............. 63-147461[U]
Jan. 6, 1989 [JP] Japan ........................ 64-903

[51] Int. Cl.⁵ .................. F16D 67/02; F16D 41/20; F16D 47/04
[52] U.S. Cl. .................. 192/12 BA; 192/415; 192/48.92; 192/81 C
[58] Field of Search ............... 192/12 BA, 26, 33 C, 192/41 S, 48.92, 81 C

[56] References Cited

U.S. PATENT DOCUMENTS

| 1,915,885 | 6/1933 | Gillett . | |
|---|---|---|---|
| 3,844,390 | 10/1974 | Lowery | 192/26 |
| 3,921,771 | 11/1975 | Szabo | 192/12 BA |
| 3,990,554 | 11/1976 | Lowery | 192/26 |
| 4,257,500 | 3/1981 | Brunner | 192/35 |
| 4,825,988 | 5/1989 | Nishimura | 192/12 BA |

FOREIGN PATENT DOCUMENTS

| 1174529 | 4/1965 | Fed. Rep. of Germany . |
| 2830350 | 11/1979 | Fed. Rep. of Germany . |
| 689204 | 9/1930 | France . |
| 436284 | 10/1935 | United Kingdom . |
| 444178 | 3/1936 | United Kingdom . |
| 597776 | 2/1948 | United Kingdom . |
| 780140 | 7/1957 | United Kingdom . |

Primary Examiner—Richard Lorence
Attorney, Agent, or Firm—Ronald P. Kananen

[57] ABSTRACT

A clutch is provided which comprises a first rotatable member, a second rotatable member provided for rotational movement relative to the first rotatable member, a coil spring wound around the first and second rotatable members, and a one-way brake. Rotation of the second rotatable member in at least one direction causes the coil spring to contract so as to fasten together the first and the second rotatable members to rotate synchronously. The one-way brake is adapted for restricting the coil spring from rotating in the winding direction and allowing it to rotate in the release direction so as to allow independent rotation of the first and second rotatable members. Therefore, power can be transmitted to the first rotatable member from the second rotatable member but not in the other direction.

16 Claims, 14 Drawing Sheets

5,022,505

ONE-WAY CLUTCH FOR TRANSMITTING ONLY ROTATION OF FIRST MEMBER TO SECOND MEMBER

BACKGROUND OF THE INVENTION

1. Technical Field

The present invention relates generally to a clutch for transmitting torque between an input and an output, and more particularly to a clutch for transmitting torque in one direction but not in the other.

2. Background Art

As such, a one-way clutch is well known in the art and is utilized for electric power steering in motor vehicles, for example. This clutch is disposed between an electric motor and a steering shaft to connect therebetween for transmitting torque in one particular state, but not in another. A clutch cam is inserted into a large cylindrical portion of the clutch via rollers. By pressing the rollers against the large cylindrical portion by the clutch cam, relative rotation between the large cylindrical portion and the clutch cam is stopped to allow torque to be transmitted.

However, in such a clutch, since the compression of the rollers against the clutch cam causes torque to be transmitted, malfunctions tend to occur because the rollers are put between the clutch cam and the large cylindrical portion.

Additionally, a one-way clutch is well know in the art which includes two rotatable members, as input and output shafts, mounted for rotation relative to each other and a coil spring wound across the rotatable members. When the coil spring is put around the rotatable members tightly, the rotatable members rotate simultaneously with each other to transmit torque therebetween. When tight winding across the members is not provided, skidding occurs between the rotatable members and torque is not transmitted.

In a conventional clutch of this type, when no torque is being transmitted, friction occurs due to contact between the inner peripheral surface of the coil spring and the outer peripheral surfaces of the rotating members. As a result, even when the clutch is disengaged, torque due to friction is still present.

Other one-way clutches are therefore sought, and it is to this end that the present invention is directed.

SUMMARY OF THE INVENTION

It is accordingly one object of the present invention to avoid the disadvantages of the prior art.

It is another object of the invention to provide a clutch which can eliminate torque at an input shaft when the clutch is disengaged.

According to one aspect of the present invention, there is provided a clutch which comprises a first rotatable member, a second rotatable member provided for rotational movement relative to the first rotatable member, an engaging means for engaging between the second and the first rotatable members to transmit torque therebetween according to rotation of the second rotatable member in at least one direction, and a means for controlling the engaging means so as to allow the first rotatable member to rotate independently of the second rotatable member according to rotation of the first rotatable member.

In the preferred mode, the engaging means includes a coil spring wound over the first and the second rotatable members. The coil spring is deformed according to the rotation of the second rotatable member so as to be reduced in diameter so as to fasten together the first and the second rotatable members to form a connection therebetween. The controlling means allows the coil spring to be spread according to the rotation of the first rotatable member in one direction and preventing the coil spring from being reduced in diameter in the other direction.

According to another aspect of the invention, there is provided a clutch which comprises a first rotatable member, a second rotatable member provided for rotational movement relative to the first rotatable member, a coil spring wound over the first and the second rotatable members, and a rotation control means attached to a part of the coil spring, the rotation control means rotating so as to spread the coil spring according to rotation of the first rotatable member in one direction and being locked so as to prevent the coil spring from rotating in the winding direction according to rotation of the first rotatable member in the other direction.

In the preferred mode, a rotation control means includes a third rotatable member connected to the part of the coil spring and a one-way clutch. The one-way clutch allows the third rotatable member to rotate in the release direction of the coil spring according to rotation of the first rotatable member in one direction to cause the coil spring to be spread and preventing the third rotatable member from rotating in the winding direction of the coil spring to restrict the coil spring from contracting according to the rotation of the first rotatable member in the other direction.

BRIEF DESCRIPTION OF THE DRAWINGS

The present invention will be understood from the detailed description given hereinbelow and from the accompanying drawings of the preferred embodiment of the invention. The description however, is not intended to limit the invention to the specific embodiment but is for explanation and understanding only.

DESCRIPTION OF THE PREFERRED EMBODIMENT

Figure 1:
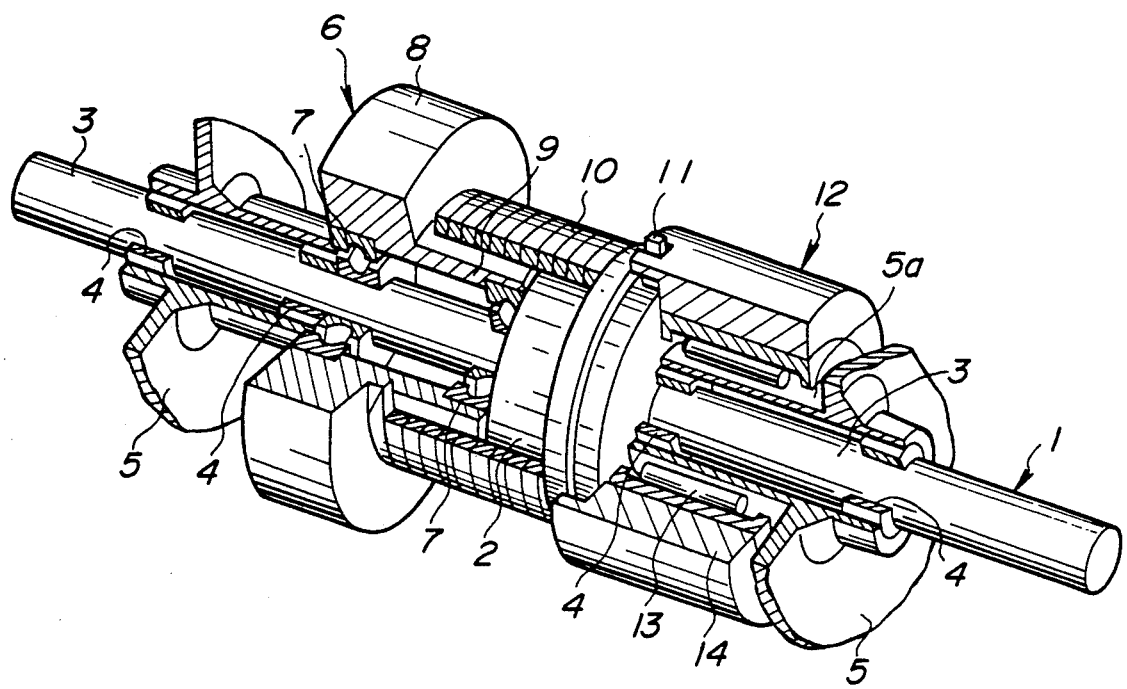
FIG. 1 is a cut-away perspective view of a clutch of a first embodiment according to the present invention.

Referring now to the drawings, particularly to FIG. 1, a clutch of a first embodiment according to the invention is shown. This clutch includes a rotatable shaft 1 as a first rotatable member and a rotatable hollow cylinder 6 as a second rotatable member. The first rotatable member 1 includes a small diameter section 3 and a large diameter section 2, which extends radially from the middle portion of section 3. The small diameter section 3 is rotatably supported by a bracket 5 and bearings 4. The second rotatable member 6 is rotatably mounted on one side of the small diameter section 3 via bearing 7. The second rotatable member 6 includes a cylinder 9 and a disc 8 radially extending outwardly at the end of the cylinder. The cylinder 9 has a diameter equal to that of the large diameter section 2 of the first rotatable member 1 and abuts thereto at its end. A coil spring 10 is wound around the large diameter section 2 and the cylinder 9. In the drawing, the coil spring 10 is wound from right to left and the folded end (the left end) 11 thereof is fixedly attached to the rotation control cylinder 12. The rotation control cylinder 12 comprises a one-way brake element 13 disposed on a cylindrical portion 5a of the bracket 5 and a cylindrical holder 14 mounted so as to surround the one-way clutch. As is well known in the art, the one-way brake element is such that power can be transmitted in one direction but not in the other. The rotation contorl cylinder 12 therefore prevents the end 11 of the coil spring 10 from rotating in the winding direction but allows it to rotate in the release direction.

In operation, transmission of torque to the first rotatable member 1 to rotate it in the clockwise direction causes the coil spring 10 to be twisted in the rotational direction of the first rotatable member 1 (i.e., in the release direction) by friction created between contacting surfaces of the large diameter section 2 and the coil spring 10. The coil spring is deformed so as to be spread radially outward. As a result of the deformation, the first rotatable member 1 and the second rotatable member 6 may rotate independently of each other. Therefore, no torque is transmitted to the second rotatable member 6 from the first rotatable member. In this instance, the rotation control cylinder 12 is rotatable in the clockwise direction to allow the coil spring to rotate in the release direction.

Transmission of torque to the first rotatable member 1 to rotate it in the counterclockwise direction urges the coil spring 10 to be twisted in the counterclockwise direction (i.e., the winding direction). The rotation control cylinder 12 however restricts the rotational motion of the coil spring 10 in the counterclockwise direction because the cylindrical portion 5a is fixed by the bracket 5 to prevent the holder 14 from rotating in the counterclockwise direction and so maintains its original position. It will be therefore appreciated that no binding force is created between the two rotatable members 1 and 6 thereby still allowing them to rotate independently of each other.

On the other hand, transmission of torque to the second rotatable member 6 to rotate it in the clockwise direction causes the coil spring 10 to be twisted in the rotational direction of the second rotatable member 6 (i.e., in the winding direction) by friction created between contacting surfaces of the cylinder 9 and the coil spring 10. The coil spring is deformed so as to be drawn radially inward. As a result of this deformation, the first rotatable member 1 and the second rotatable member 6 are clamped by the coil spring allowing frictional force to be created therebetween, causing the two rotatable members 1 and 6 to rotate integrally to transmit torque from the second rotatable member 6 to the first rotatable member 1. In this instance, since the rotation control cylinder 12 is rotatable in the clockwise direction without limitation, it rotates synchronously with the first and the second rotatable members 1 and 6.

Transmission of torque to the second rotatable member 6 to rotate it in the counterclockwise direction causes the coil spring 10 to be twisted in the counterclockwise direction (i.e., the release direction). Thus, the first and the second rotatable members 1 and 6 rotate independently of each other to transmit no power to the first rotatable member 1.

Figure 2:
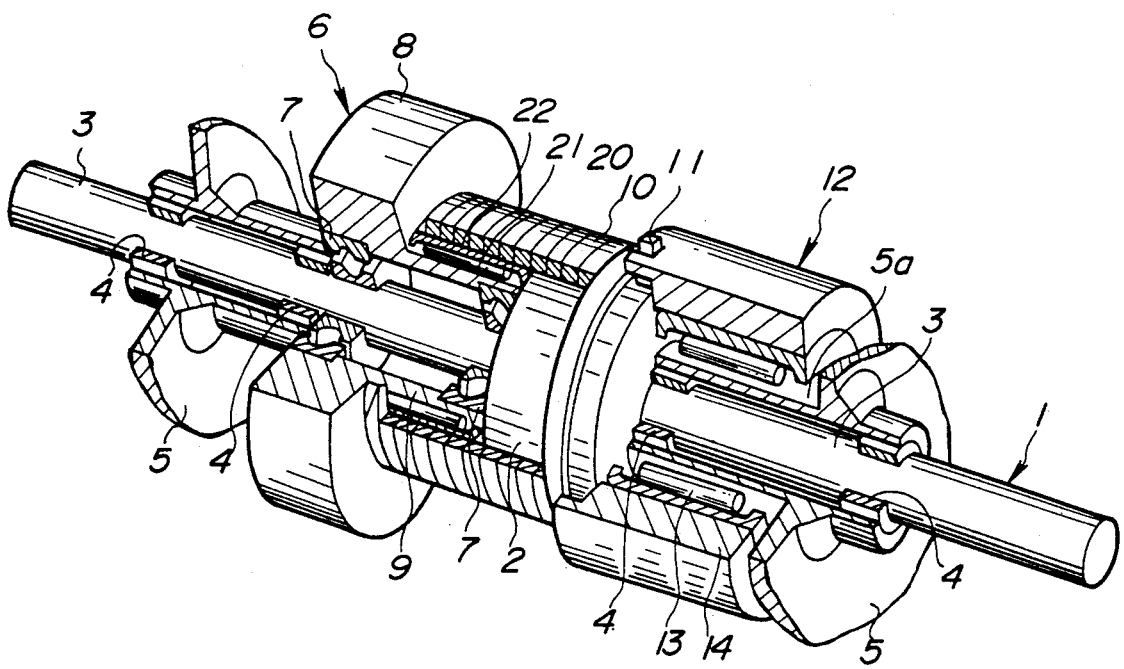
FIGS. 2 through 19 are cut-away perspective views which show modified forms of a clutch according to the invention.

Referring to FIG. 2, there is illustrated a modified form of the first embodiment. Construction of this clutch is the same as the clutch shown in FIG. 1 except a one-way brake element 20, which is installed on the cylinder 9, is provided. This one-way clutch 20 comprises rollers 21 and a casing 22 for accommodating the rollers. The casing has an outer diameter equal to that of a large diameter section 2. The one-way clutch 20 is adapted for allowing the second rotatable member 6 to rotate in the counterclockwise direction. A coil spring 10 is provided around the casing 22 and the large diameter section 2 of the first rotatable member 1 similarly to the previous embodiment.

In operation, transmission of torque to the first rotatable member 1 to rotate it in the clockwise direction causes the coil spring 10 to be twisted in the rotational direction of the first rotatable member 1 (i.e., in the release direction) by friction created between contacting surfaces of the large diameter section 2 and the coil spring 10. The coil spring is deformed so as to be spread radially outward. The one-way clutch 20 rolls so as to allow rotational movement in the clockwise direction of the coil spring. As a result, the first rotatable member 1 and the second rotatable member 6 rotate independently of each other. No torque is therefore transmitted to the second rotatable member 6 from the first rotatable member. In this instance, the rotation control cylinder 12 is rotatable in the clockwise direction to allow the coil spring to rotate in the release direction.

Transmission of torque to the first rotatable member 1 to rotate it in the counterclockwise direction causes the coil spring 10 to be twisted in the counterclockwise direction (i.e., the winding direction). The rotation control cylinder 12 however restricts the rotational motion in the counterclockwise direction of the coil spring 10. It will be appreciated therefore that no binding force is provided between the first rotatable member 1 and the one-way clutch 20 (or therethrough to the second rotatable member 6), so the first rotatable member 1 and coil spring 10 slidably rotate with each other transmitting no torque to the second rotatable member 6 from the first rotatable member 1.

Transmission of torque to the second rotatable member 6 to rotate it in the clockwsie direction causes the one-way clutch 20 to be locked with the result that the second rotatable member 6 and the one-way clutch 20 rotate coincidently with each other in the clockwise direction. Frictional force is generated between the contacting surfaces of the casing 22 of the one-way clutch 20 and the coil spring 10 to cause the coil spring to be twisted in the rotational direction of the second rotatable member 6 and to be drawn inward radially (i.e., in the winding direction). As a result, the one-way clutch 20 and the first rotatable member 1 are clamped by the coil spring to rotate integrally, thereby transmitting torque to the first rotatable member 1 from the second rotatable member 6. In this instance, since the rotation control cylinder 12 is rotatable in the clockwise direction without limitation,, it rotates synchronously with the first and the second rotatable members 1 and 6.

Transmission of torque to the second rotatable member 6 to rotate it in the counterclockwise direction causes the one-way clutch 20 to roll. Thus, no torque is transmitted to the first rotatable member 1 from the second rotatable member 6.

Figure 3:
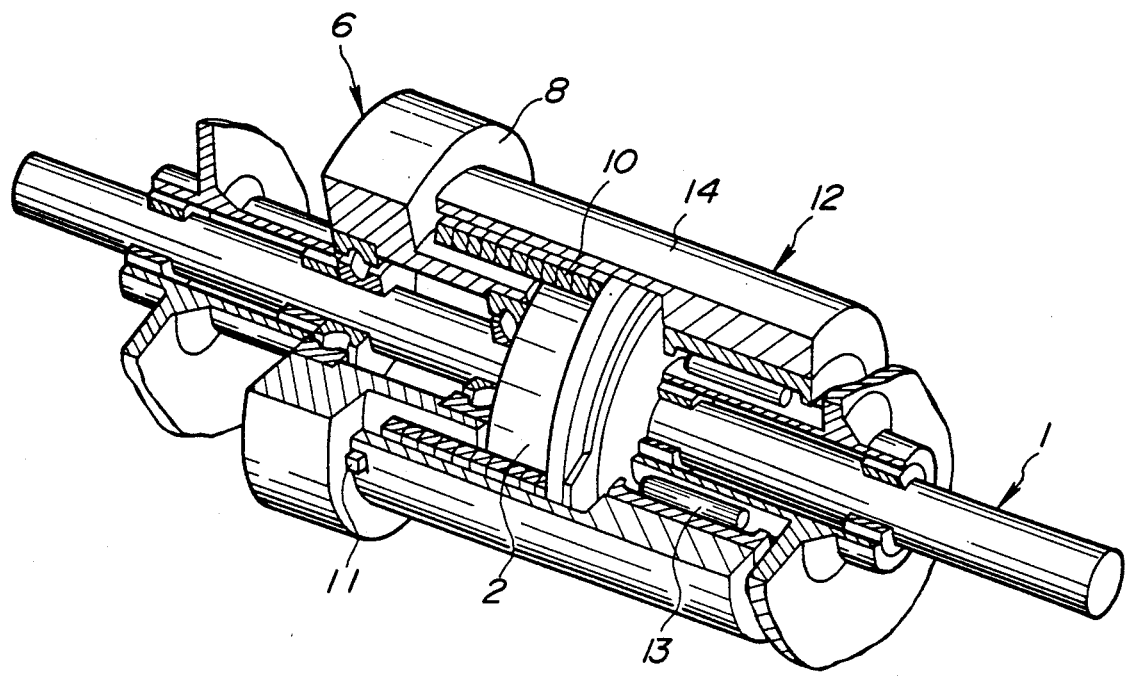

Referring to FIG. 3, a second embodiment of a clutch according to the invention is shown. In this embodiment, a holder 14 for a rotation control cylinder 12 extends closely to a disc portion 8 of a second rotatable member 6 and an end 11 of a coil spring 10 engages an extended end of the holder. Additionally, the rotation control member 12 may rotate in a direction opposite that of the first embodiment (i.e., the counterclockwise direction), allowed by the rotational direction of a one-way brake element 13. While these two points are different from the above mentioned first embodiment, the other elements of construction are essentially the same.

In operation, rotation of the first rotatable member 1 in the clockwise direction causes the coil spring to be spread so as to allow the first rotatable member to rotate independently from second rotatable member 6. Therefore, no torque is transmitted to the second rotatable member from the first rotatable member.

Rotation of a first rotatable member 1 in the clockwise direction causes the coil spring to be deformed so as to be drawn in radially and thus the first rotatable member 1 and a second rotatable member 6 are locked together via the coil spring 10 due to the tight compression of the coil spring 10. The rotation control cylinder 12 can rotate in the counterclockwise direction. The first rotatable member 1 rotates in the counterclockwise direction in cooperation with the second rotatable member 6 to transmit torque to the second rotatable member 6.

Rotation of the second rotatable member 6 in the clockwise direction causes the end 11 of the coil spring 10, connected to the rotational control cylinder, to be prevented from rotating by the rotation control cylinder. Thus, no binding force is provided by the coil spring 10 between the first and second rotatable members 1 and 6 and therefore no torque is provided to the first rotatable member from the second rotatable member.

Rotation of the second rotatable member 6 in the counterclockwise direction causes the coil spring 10 to be spread in the release direction so as to reduce frictional force between the coil spring and the large diameter section 2 of the first rotatable member 1, allowing the second rotatable member 6 to rotate independently of the first rotatable member 1. Thus, no torque is transmitted to the first rotatable member 1.

Figure 4:
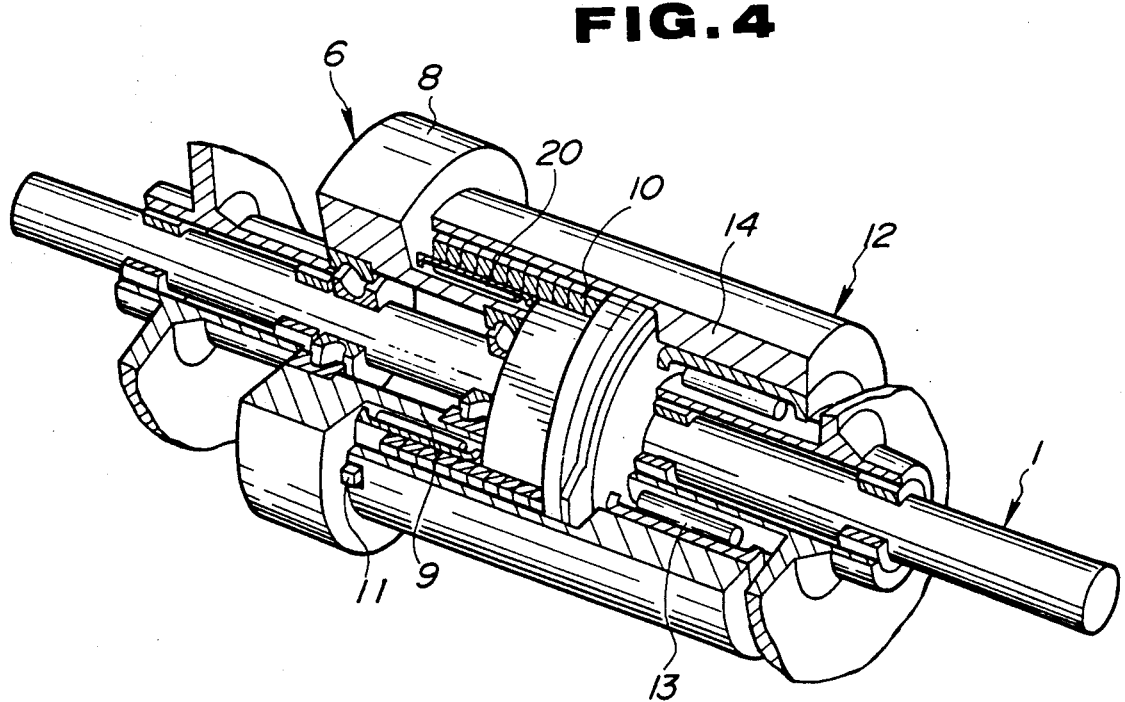

Referring to FIG. 4, there is illustrated a modified form of the second embodiment. Construction of this clutch is the same as the clutch shown in FIG. 3 except for the provision of a one-way clutch 20 which is installed on the cylinder 9. The one-way clutch 20 is adapted for allowing the second rotatable member 6 to rotate only in the counterclockwise direction.

In operation, rotation of the first rotatable member 1 in the clockwise direction causes the coil spring to be spread so as to allow the first rotatable member 1 to rotate independently of the second rotatable member 6. Therefore, no torque is transmitted to the second rotatable member from the first rotatable member.

Rotation of the first rotatable member 1 in the clockwise direction causes the coil spring to be deformed so as to be drawn inwardly and thus the first rotatable member 1 and the one-way clutch 20 are fastened by the coil spring 10 and locking of the one-way clutch 10 is encountered causing the one-way clutch to rotate synchronously with the second rotatable member 6. Since the rotation control cylinder 12 can rotate in the counterclockwise direction, it rotates synchronously with the first and second rotatable members 1 and 6. Thus, torque is transmitted to the second rotatable member from the first rotatable member.

Rotation of the second rotatable member 6 in the clockwise direction causes the one-way clutch 20 to lock. The one-way clutch 20 and the second rotatable member 6 rotate synchronously. Twisting of the end portion 11 of the coil spring 10 in the winding direction (i.e., in the clockwise direction) is restricted by the rotation control cylinder 12 because another one-way brake element 13 prevents the cylinder 12 from rotating in the clockwise direction. As a result, the one-way clutch 20 (and thus, the second rotatable member 6) and the first rotatable member 1 are not fastened by the coil spring 10. Thus, sliding occurs between the one-way clutch 20 and the coil spring 10 transmitting no torque to the first rotatable member 1 from the second rotatable member 6.

Rotation of the second rotatable member 6 in the counterclockwise direction causes the one-way clutch 20 to rotate. No torque therefore, is transmitted to the first rotatable member 1 from the second rotatable member 6.

Figure 5:
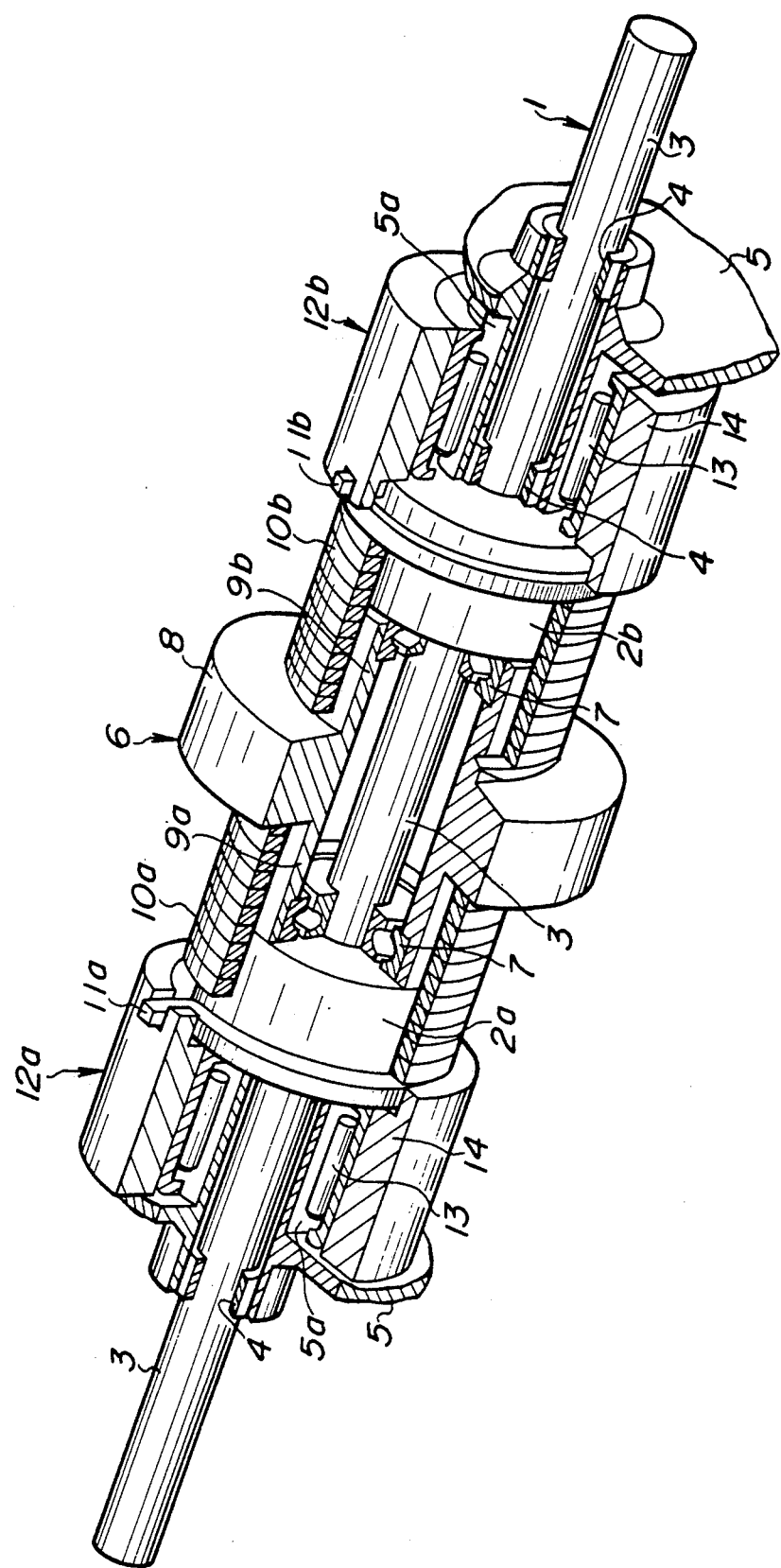

Referring to FIG. 5, a clutch of a third embodiment according to the invention is shown. This clutch includes a first rotatable member 1 which has a pair of large diameter sections 2a and 2b each extending radially outward and spaced from each other by a given distance. The first rotatable member 1 is rotatably supported by a bracket 5 via bearings 4. A second rotatable member 6 is arranged between the pair of large diameter sections 2a and 2b for rotation relative to the middle portion 3 of the first rotatable member 1 by a pair of bearings 7. The second rotatable member 6 includes a disc 8 radially extending from the middle thereof and cylinders 9a and 9b formed at both sides of the disc. The cylinders 9a and 9b have diameters equal to those of large diameter sections 2a and 2b so as to be aligned with the pair of large diameter sections 2a and 2b. A first coil spring 10a and a second coil spring 10b are wound around the large diameter section 2a and the cylinder 9a and the large diameter section 2b and the cylinder 9b respectively. Each of the coil springs 10a and 10b is wound in the clockwise direction in the drawing. Folded end 11a of the first coil spring 10a engages a rotation control cylinder 12a and folded end 11b of the second coil spring 10b engages a rotation control cylinder 12b. The rotation control cylinder 12a prevents the coil spring 10a from rotating in the winding direction (i.e., in the clockwise direction), while the rotation control cylinder 12b prevents the coil spring 10b from rotating in the winding direction (i.e., in the counterclockwise direction). Each of the rotation control cylinders 12a and 12b is, similar to the above embodiment, provided with a one-way clutch 13 mounted on a cylinder 5a of a bracket 5 and a holder 14 installed on the periphery of the one-way brake element 13.

In operation, rotation of the first rotatable member 1 in the clockwise direction causes the second coil spring 10b to be spread, while the first coil spring 10a is prevented from contracting (i.e., it may rotate in the winding direction) by the rotational control cylinder 12a. Therefore, binding between the large diameter section 2a of the first rotatable member 1 and the cylinder 9a of the second rotatable member 6, encased by the first coil spring 10a does not take place. The first coil spring is deformed so as to be spread. The first rotatable member 1 and the second rotatable member 6 do not rotate together therefore torque is not transmitted to the second rotatable member 6 from the first rotatable member 1.

Rotation of the first rotatable member 1 in the counterclockwise direction causes the second coil spring 10b to be prevented from reducing in diameter (i.e., rotating in the winding direction). No fastening force caused by the second coil spring 10b is therefore provided for the large diameter section 2b of the first rotatable member 1 and the cylinder 9b of the second rotatable member 6 and the first coil spring 10a to be extended in diameter. The first rotatable member 1 rotates independently upon the second rotatable member 6 to provide no torque to the second rotatable member from the first rotatable member.

Rotation of the second rotatable member 6 in the clockwise direction causes the second coil spring to draw inwardly, becoming small in diameter, thereby fastening together the cylinder 9b of the second rotatable member and the large diameter section 2b of the first rotatable member 1. The first spring 10a, conversely, expands so as to be spread. Thus, the first rotatable member 1, the second rotatable member 6, and the rotation control cylinder 12b synchronously rotate in the clockwise direction to transmit torque to the first rotatable member from the second rotatable member.

Rotation of the second rotatable member 6 in the counterclockwise direction causes the second coil spring 10 to be spread and the first coil spring 10a to be drawn inwardly so as to fasten together the cylinder 9a of the second rotatable member 6 and the large diameter section 2a of the first rotatable member 1. The first rotatable member 1, the second rotatable member 6, and the rotation control cylinder 12a therefore rotate synchronously in the counterclockwise direction to transmit torque to the first rotatable member from the second rotatable member 6.

Figure 6:
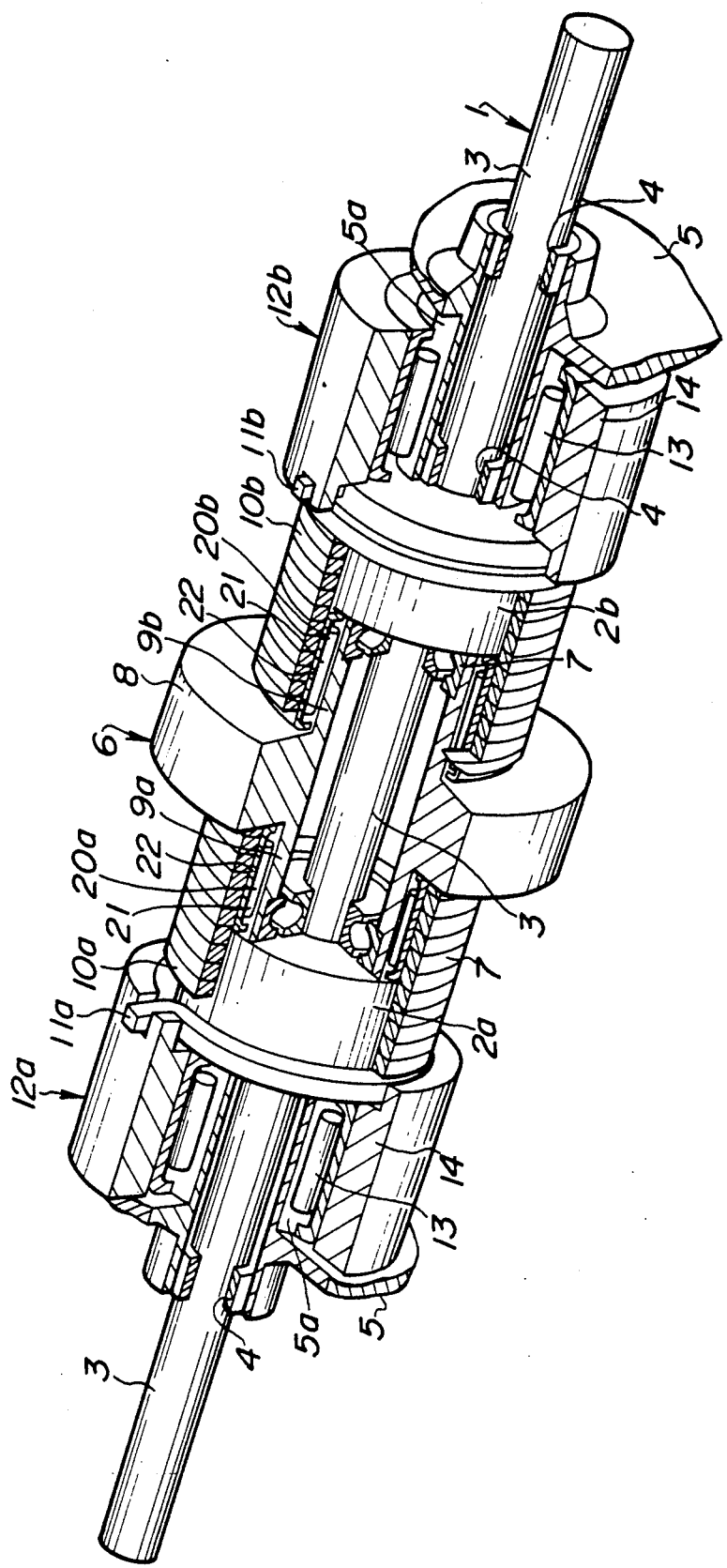

Referring to FIG. 6, a modified form of the third embodiment is shown. The construction of the clutch is essentially the same as the clutch shown in FIG. 5 except for the provision of one-way clutches 20a and 20b installed on cylinders 9a and 9b. Each one-way clutch comprises rollers 21 and a casing 22 for accommodating the rollers which have an outer diameter substantially equal to that of the large diameter section of the first rotatable member 1. The one-way clutch 20a is adapted for allowing the second rotatable member to rotate in the clockwise direction, while the one-way clutch 20b is adapted for allowing the second rotatable member 6 to rotate in the counterclockwise direction. Coil springs 10a and 10b are wound around the casings 22 and the large diameter sections 2a and 2b.

In operation, rotation of the first rotatable member 1 in the clockwise direction causes the second coil spring 10b to be spread, while the first coil spring 10a is prevented from contracting (i.e., it rotates in the winding direction) by the rotation control cylinder 12a. No binding force created by the first coil spring 10a is therefore provided to the large diameter section 2a of the first rotatable member 1 and the one-way clutch 20a. The first rotatable member 1 can rotate independently of the second rotatable member 6 providing no torque to the second rotatable member from the first rotatable member.

Rotation of the first rotatable member 1 in the counterclockwise direction causes the second coil spring 10b to be prevented from drawing inwardly (i.e., rotating in the winding direction). No binding force is therefore caused by the second coil spring 10b provided for the large diameter section 2b of the first rotatable member 1 and the one-way clutch 20b. The first coil spring 10a is spread, thus extending in diameter, and the first rotatable member 1 rotates independently of the second rotatable member 6 providing no torque to the second rotatable member from the first rotatable member.

Rotation of the second rotatable member 6 in the clockwise direction causes the one-way clutch 20b to be locked so as to rotate with the second rotatable member 6 and the other one-way clutch 20a rolls around the cylinder 9a of the second rotatable member 6. The second coil spring 10b therefore contracts in diameter so that the second coil spring fastens together the large diameter section 2b of the first rotatable member and the one-way clutch 20b, the second rotatable member rotating thereby with the first rotatable member to transmit torque to the first rotatable member. In this instance, the rotation control cylinder 12b rotates with the first and the second rotatable members 1 and 6.

Rotation of the second rotatable member 6 in the counterclockwise direction causes the one-way clutch 20b to roll around the cylinder 9b of the second rotatable member 6 and the one-way clutch 20a to be locked so as to rotate with the second rotatable member 6. Clamping force caused by the first coil spring 10a is provided for the large diameter section 2a and the one-way clutch 20a. The second rotatable member, in turn, rotates with the first rotatable member 1 to transmit torque to the first rotatable member. In this instance, the rotation control cylinder 12a rotates synchronously with the first and the second rotatable members 1 and 6.

Figure 7:
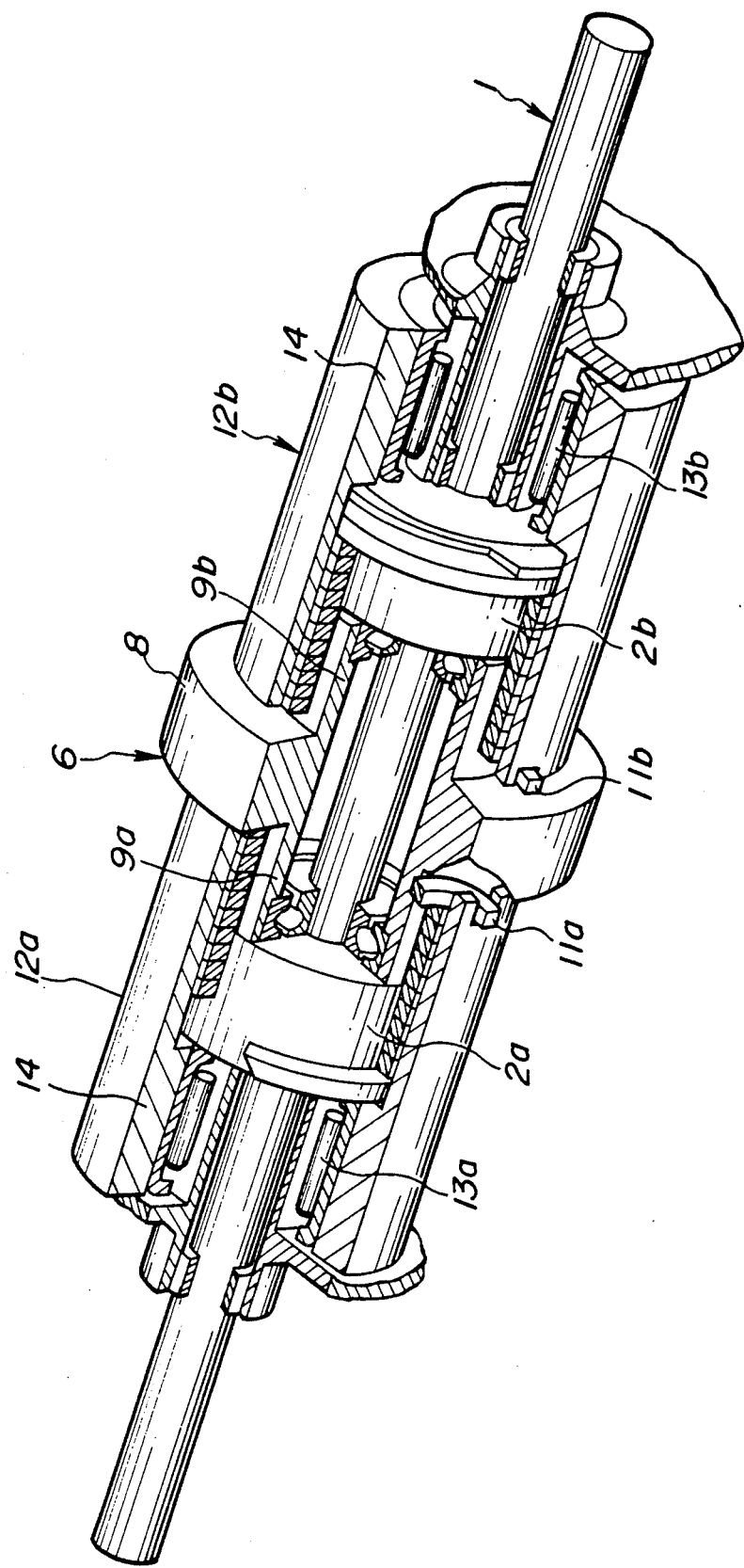

Referring to FIG. 7, a fourth embodiment of a clutch according to the invention is shown. This clutch differs from the clutch of the third embodiment in that holders 14 of rotation control cylinders 12a and 12b extend closely to a disc portion 8 of the second rotatable member 6 and end portions 11a and 11b of coil springs 10a and 10b engage the extended sections thereof. Additionally, in this embodiment, a one-way brake element 13b on the right side allows the rotation control cylinder 12b to rotate only in the counterclockwise direction, while a one-way brake element 13a on the left side allows the rotation control cylinder 12a to rotate only in the clockwise direction. Otherwise, the construction is similar to that of the above mentioned third embodiment.

In operation, rotation of the first rotatable member 1 in the clockwise direction causes the second coil spring 10b to spread and the first coil spring 10a to contract so as to fasten together the large diameter section 2a of the first rotatable member 1 and the cylinder 9a of the second rotatable member 6. The first and the second rotatable members 1 and 6 and the rotation control cylinder 12a rotate synchronously with each other in the clockwise direction to transmit torque to the second rotatable member from the first rotatable member.

Rotation of the first rotatable member in the counterclockwise direction causes the second coil spring 10b to be reduced in diameter so as to fasten the large diameter section 2b of the first rotatable member 1 and the cylinder 9b of the second rotatable member 6 and the first coil spring 10a to be spread in diameter. The first and the second rotatable members 1 and 6 and the rotation control cylinder 12b therefore rotate synchronously in the counterclockwise direction to transmit torque to the second rotatable member from the first rotatable member.

Rotation of the second rotatable member 6 in the clockwise direction causes the second coil spring 10b to be prevented from contracting (i.e., rotating in the winding direction) by the rotation control cylinder 12b and the first coil spring 10a to be spread in diameter. No binding force caused by the second coil spring 10b is therefore provided to the large diameter section 2b of the first rotatable member 1 or the cylinder 9b of the second rotatable member 6. The second rotatable member 6 rotates independently of the first rotatable member 1 transmitting no torque to the first rotatable member.

Rotation of the second rotatable member 6 in the counterclockwise direction causes the second coil spring 10b to be spread in diameter and the first coil spring 10a is prevented from contracting in diameter (i.e., rotating in the winding direction) by the rotation control cylinder 12a. No binding force caused by the first coil spring 10a is therefore provided to the large diameter section 2a of the first rotatable member 1 or the cylinder 9a of the second rotatable member 6. The second rotatable member 6 rotates independently of the first rotatable member 1 transmitting no torque to the first rotatable member.

Figure 8:
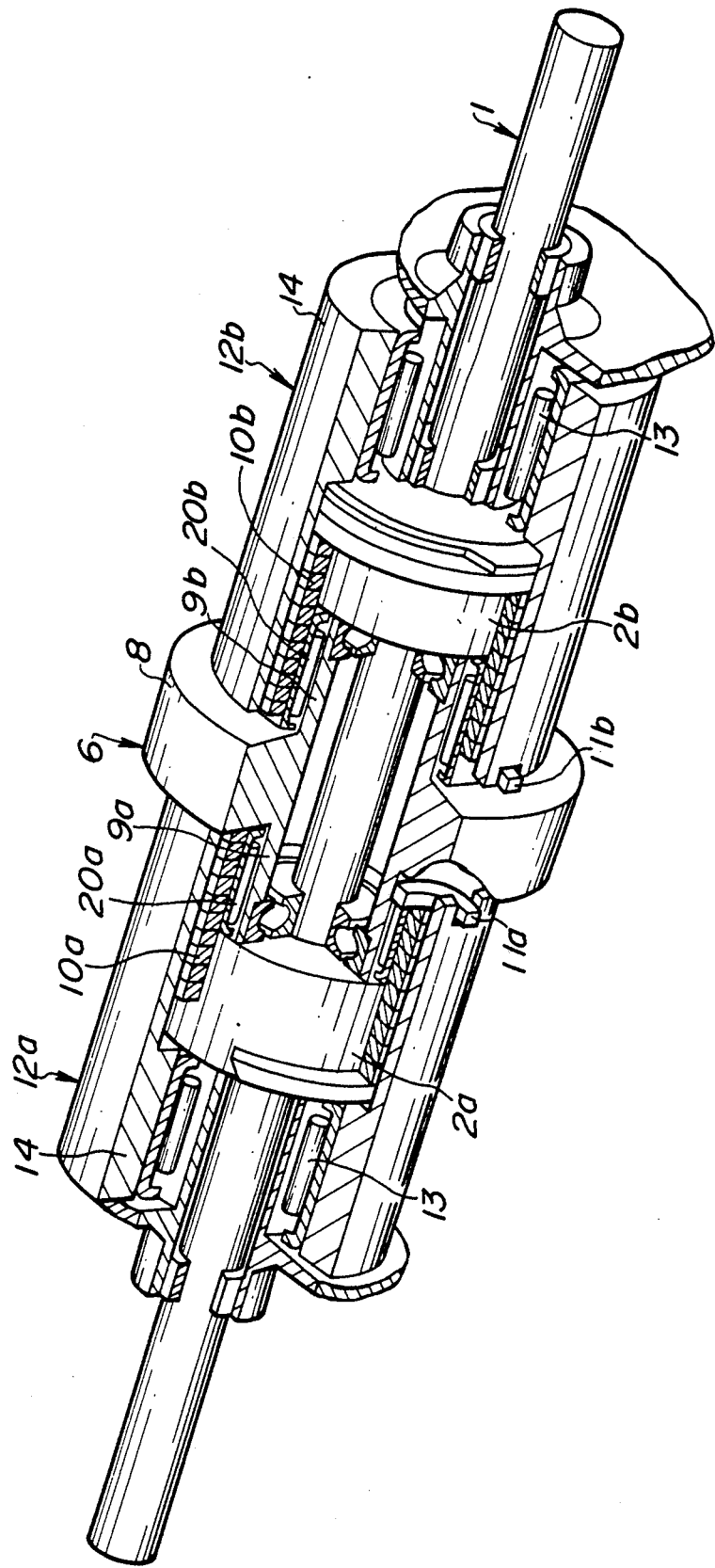
Figure 9:
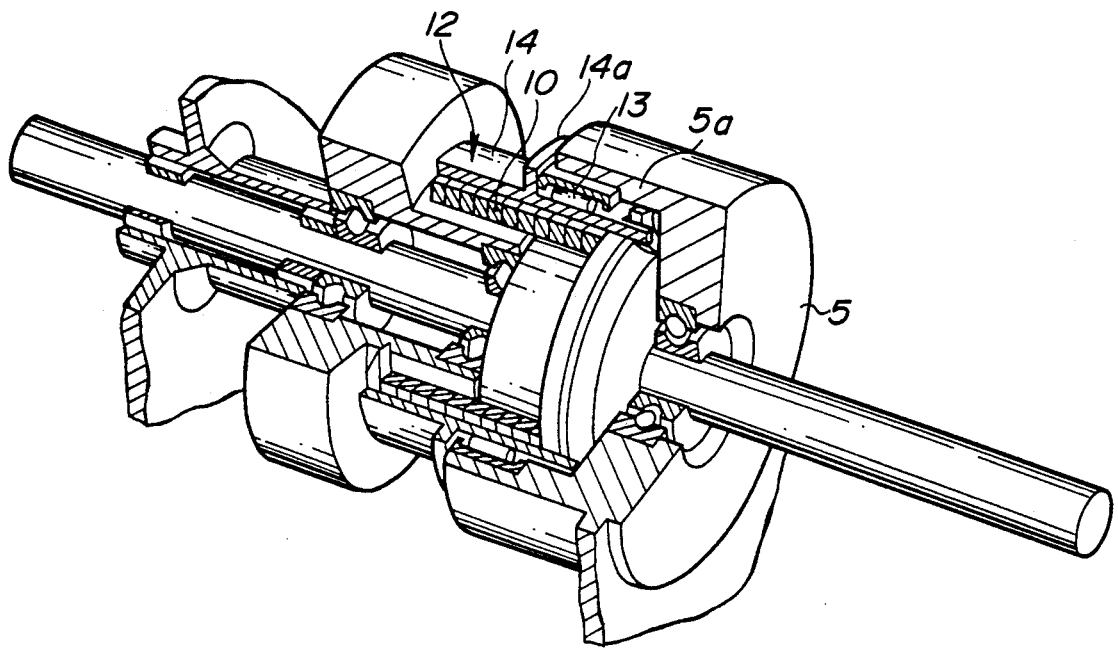
Figure 10:
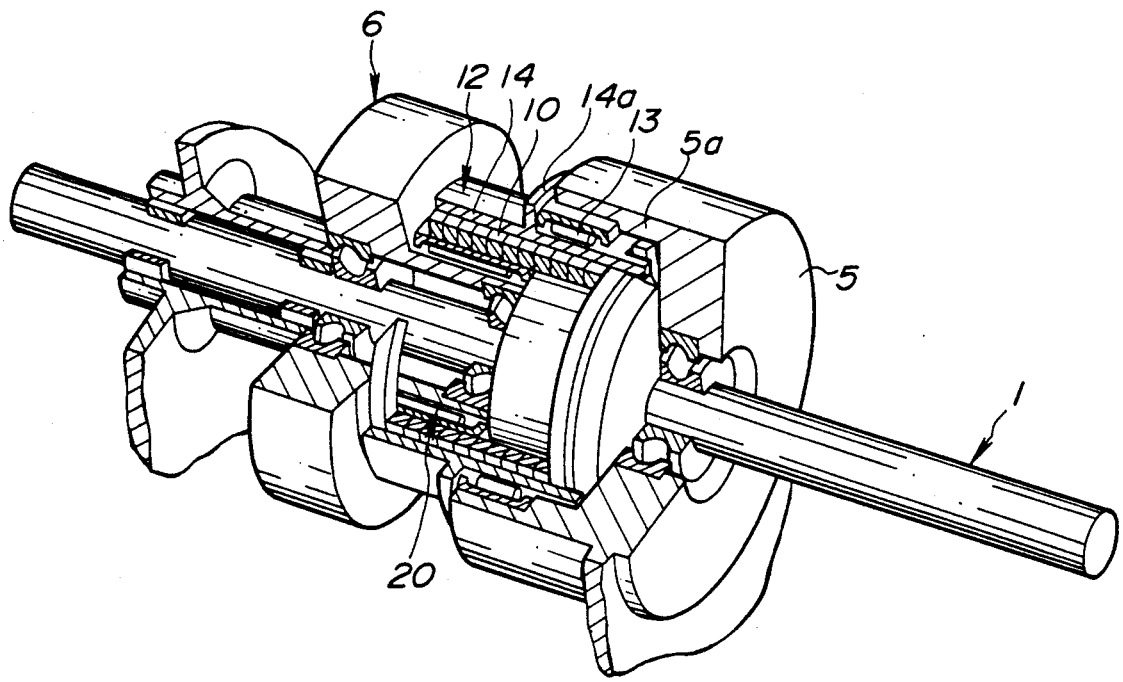
Figure 11:
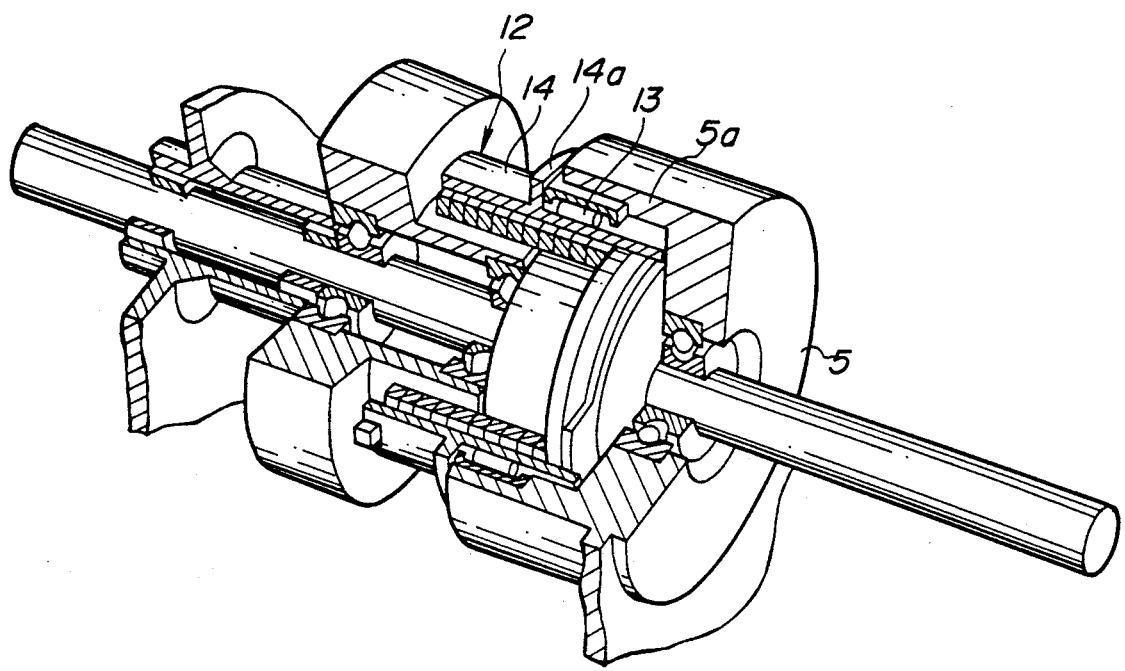
Figure 12:
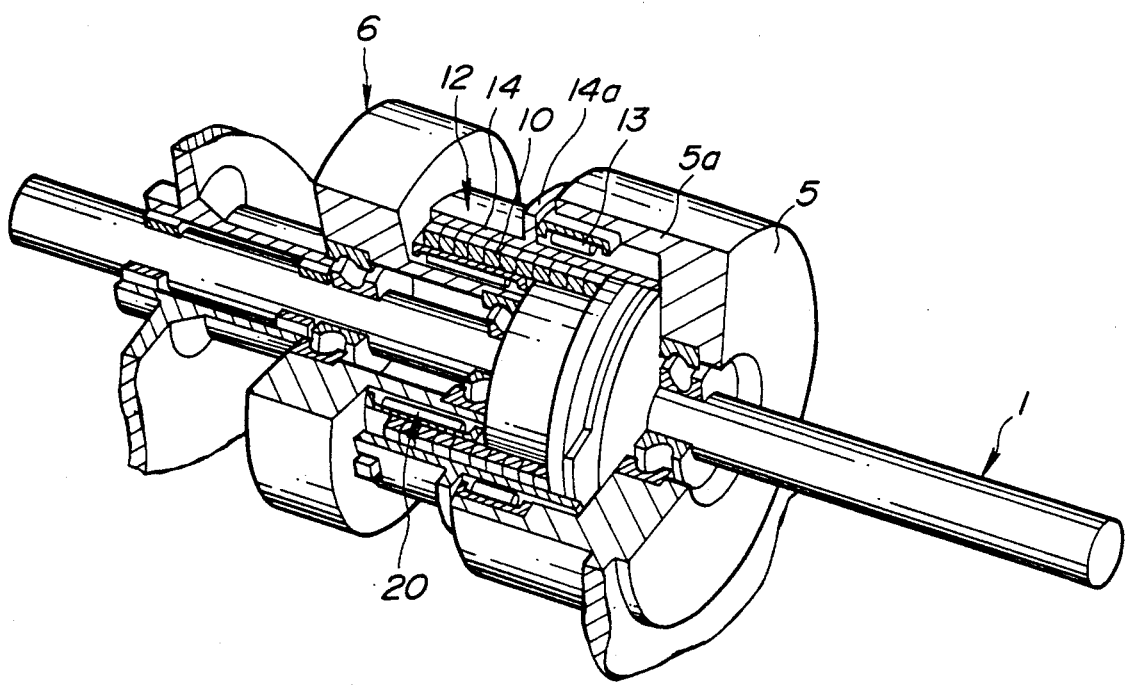
Figure 13:
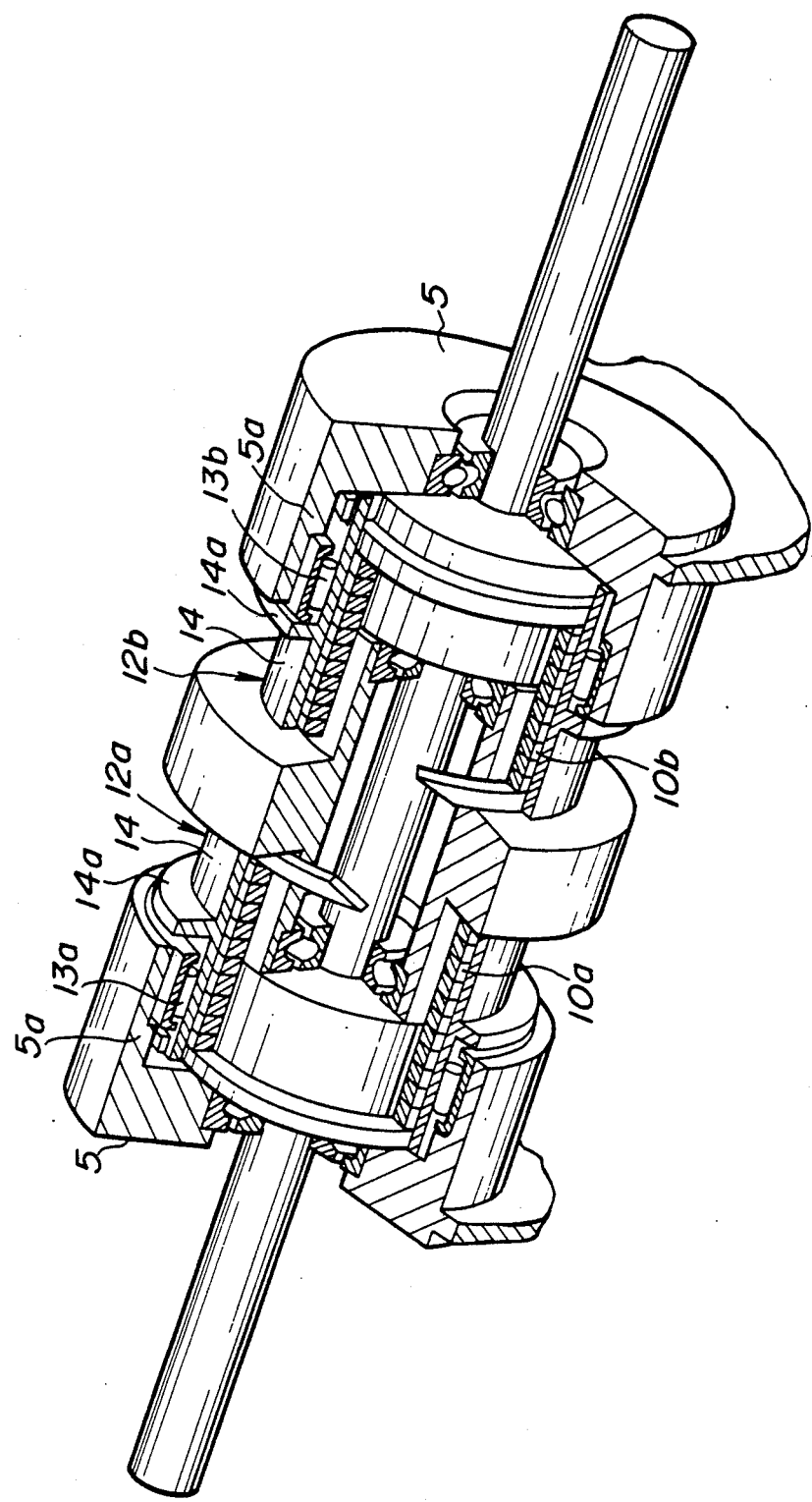
Figure 14:
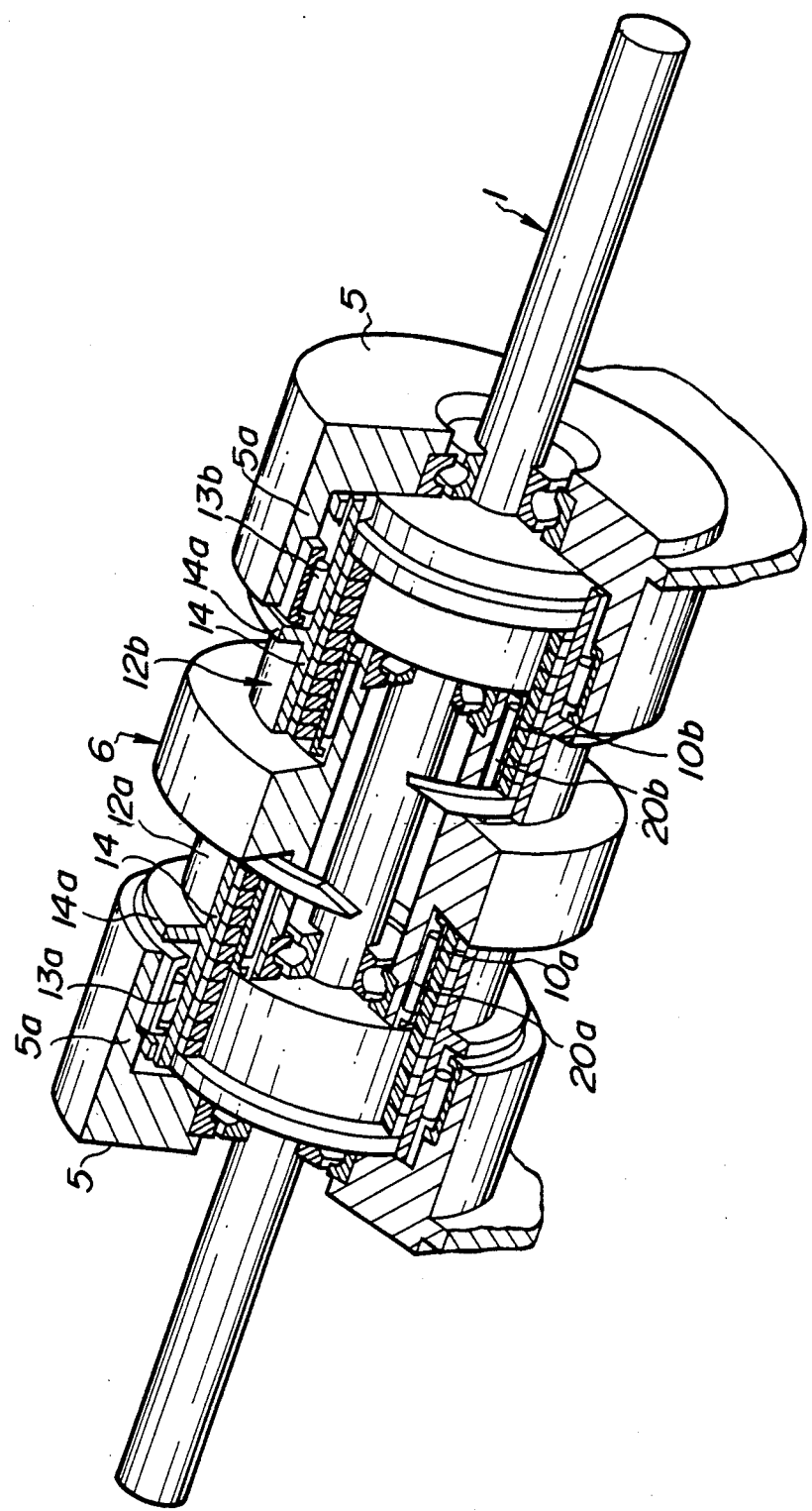
Figure 15:
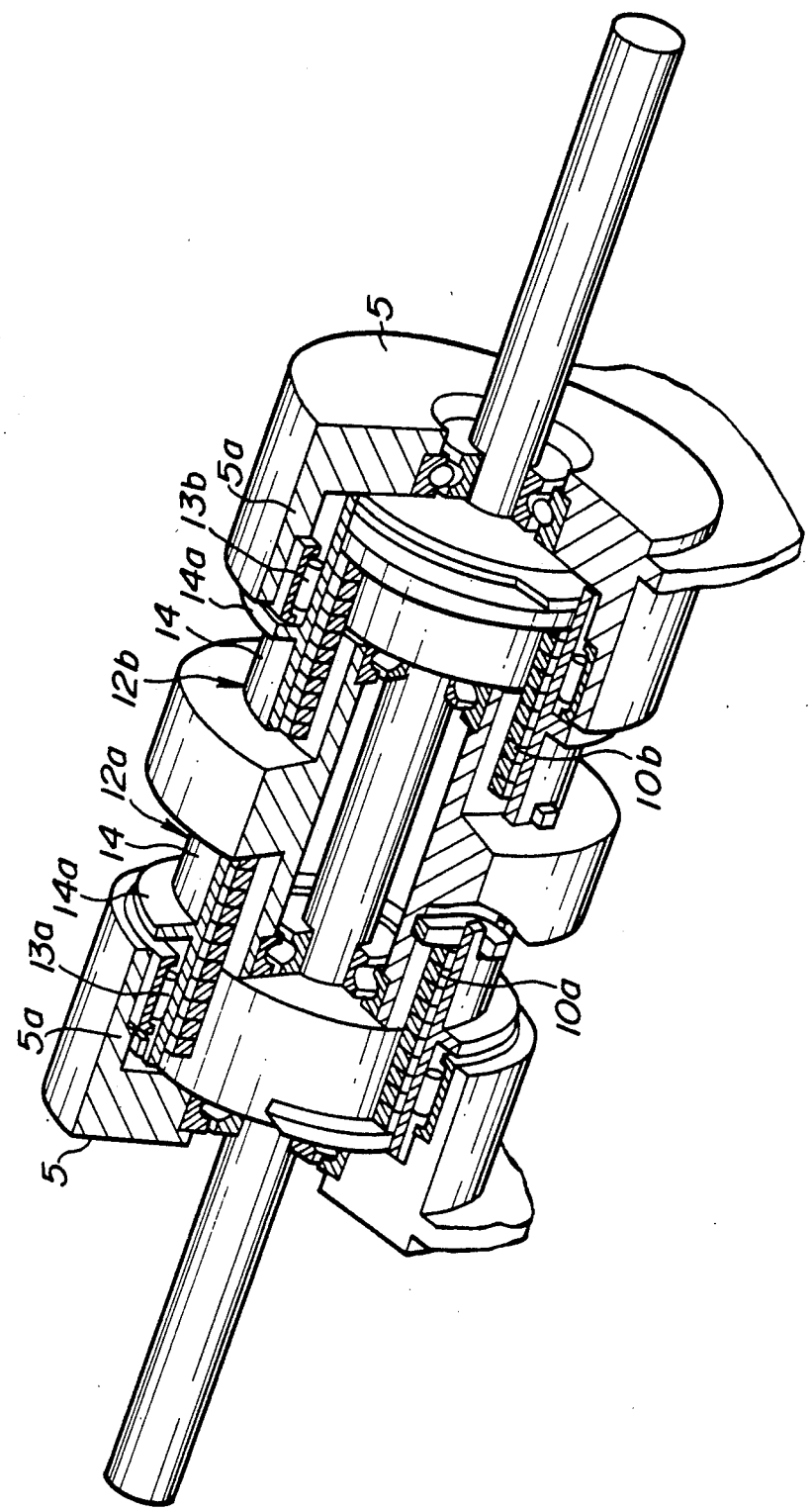
Figure 16:
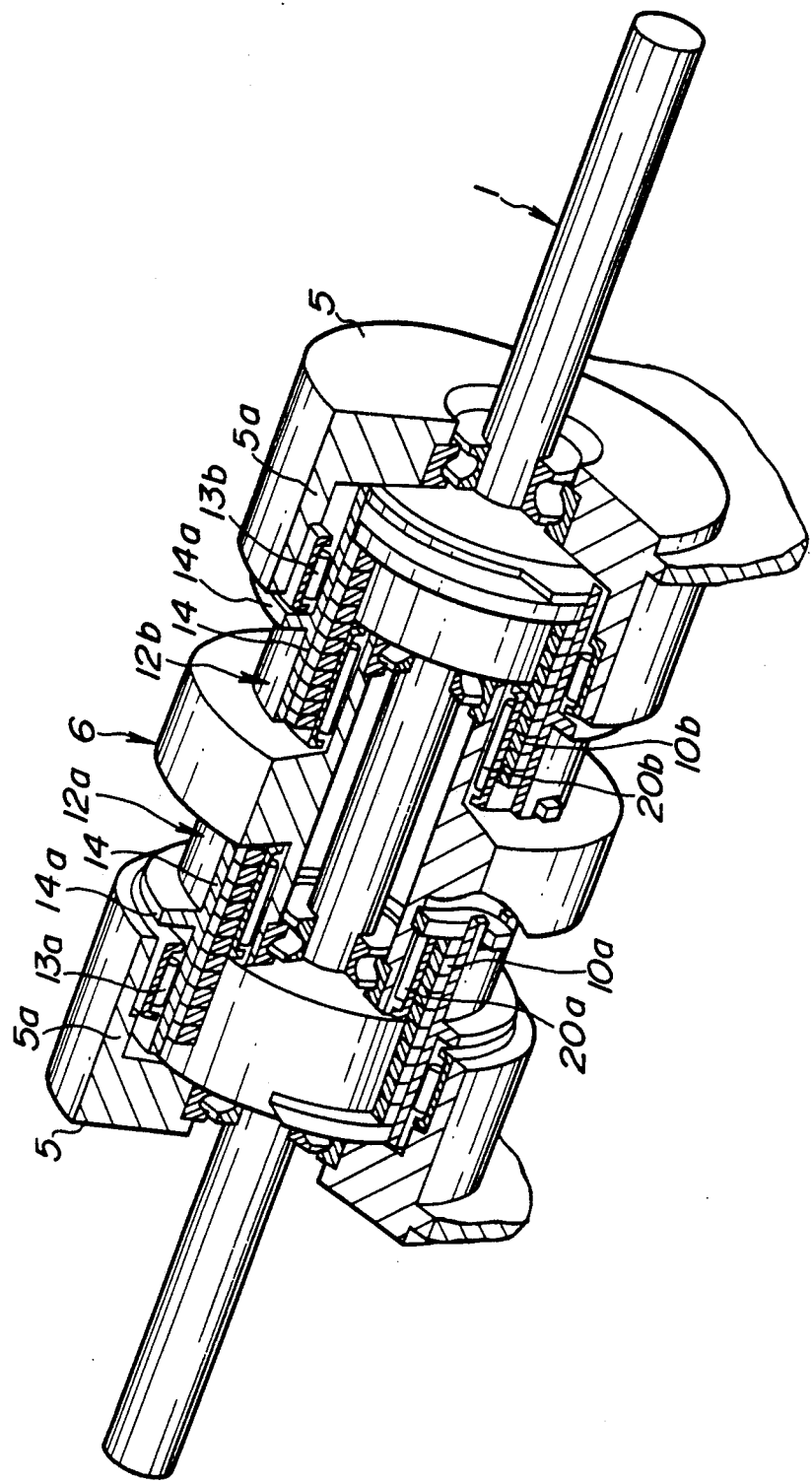
Figure 17:
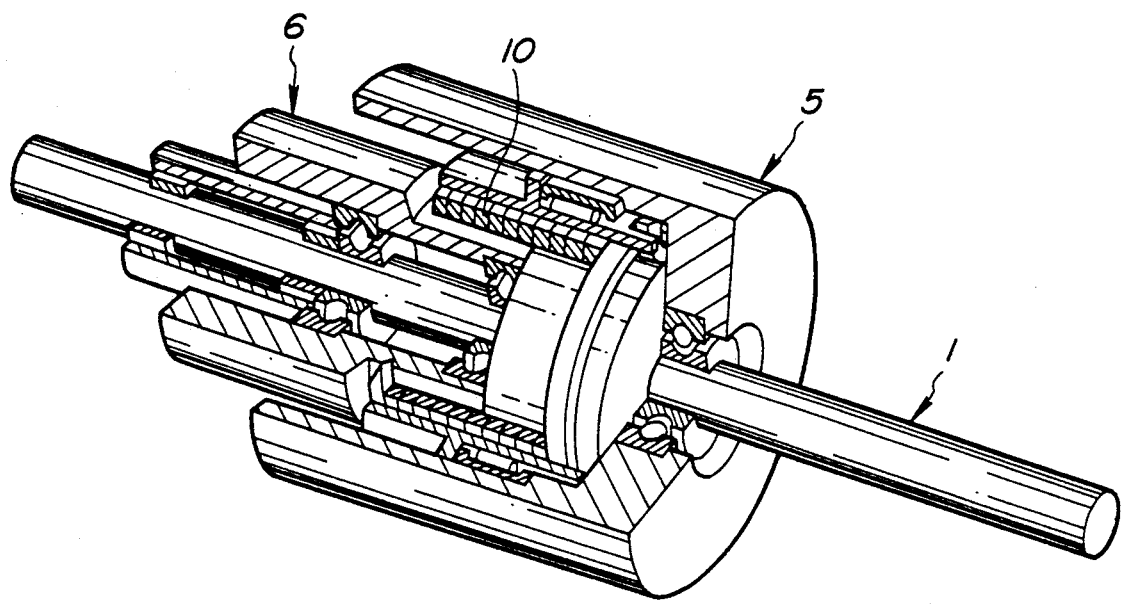

Referring to FIG. 8, a modified form of the above described fourth embodiment is shown. This clutch includes one-way clutches 20a and 20b which are disposed between cylinders 9a and 9b of the second rotatable member 6 and first and second coil springs 10a and 10b respectively. The one-way clutch 20a allows the second rotatable member 6 to rotate only in the clockwise direction, while the other one-way clutch 20b allows the second rotatable member to rotate only in the counterclockwise direction.

In operation, rotation of the first rotatable member 1 in the clockwise direction causes the second coil spring 10b to spread in diameter and the first coil spring 10a to be contract in diameter so as to fasten together the large diameter section 2a of the first rotatable member 1 and the one-way clutch 20a. The one-way clutch 20a is locked to rotate synchronously with the second rotatable member 6, while the one-way clutch 20b rolls around the cylinder 9b of the second rotatable member 6. The first and the second rotatable members 1 and 6 rotate synchronously with each other to transmit torque to the second rotatable member from the first rotatable member. The rotation control cylinder 12a also rotates with the first and the second rotatable members 1 and 6.

Rotation of the first rotatable member in the counterclockwise direction causes the second coil spring 10b to be reduced in diameter so as to fasten together the large diameter section 2b of the first rotatable member 1 and one-way clutch 20b, the first coil spring 10a is spread in diameter. The one-way clutch 20b is, in turn, locked to rotate with the second rotatable member 6. The first and the second rotatable members 1 and 6 therefore rotate sychronously to transmit torque to the second rotatable member from the first rotatable member. The rotation control cylinder 12a also rotates with the first and the second rotatable members 1 and 6.

Rotation of the second rotatable member 6 in the clockwise direction causes the one-way clutch 20a to roll around the cylinder 9a of the second rotatable member 6 and the other one-way clutch 20b to be locked to rotate with the second rotatable member 6. As a result of these rotations, the second coil spring is urged in the winding direction (i.e., in the clockwise direction). That rotation of the end 11b in the winding direction is however limited by the rotation control cylinder 12b to cause skidding to occur between the one-way clutch 20b and the coil spring 10b. The second rotatable member 6 therefore rotates independently of the first rotatable member 1 transmitting no torque to the first rotatable member.

Rotation of the second rotatable member 6 in the counterclockwise direction causes the one-way clutch 20a to lock, rotating with the second rotatable member 6 and the other one-way clutch 20b to roll around the cylinder 9b of the second rotatable member 6. The first coil spring is urged in the winding direction (i.e., in the counterclockwise direction). Rotational movement of the end 11a is however restricted by the rotation control cylinder 12a to cause skidding to occur between the one-way clutch 20a and the coil spring 10a. The second rotatable member 6 therefore rotates independently of the first rotatable member 1 transmitting no torque to the first rotatable member.

As described above, in a clutch which includes a one-way clutch disposed between one rotatable member and a coil spring, while no torque is being transmitted, frictional resistance occurring between contacting surfaces of the coil spring and the rotatable members is reduced by the rotating one-way clutch. Torque of the rotating first or the second rotatable members can be reduced when no torque is transmitted therebetween. This results in reduced wear on the contact surfaces and improved durability of the clutch.

Referring to FIGS. 9 to 17, modified forms of FIGS. 1 to 8 are shown. In these embodiments, the rotation control cylinders 12, 12a, and 12b shown in FIGS. 1 to 8 are replaced by holders 14 which surround the outer peripheries of coil springs 10, 10a, and 10b for relative movement thereto and one-way brake elements 13a and 13b which ae mounted on the holders. Each of one-way brake elements 13a and 13b is inserted into a housing formed in a cylindrical cavity 5a of a bracket 5. Each holder includes a flange 14a for positioning the axis of the one-way clutch.

While the modified forms shown in FIGS. 9 to 17 differ from the previously mentioned embodiments in the construction of the rotation control cylinder, they operate similarly to the embodiments in FIGS. 1 to 8 respectively.

Figure 18:
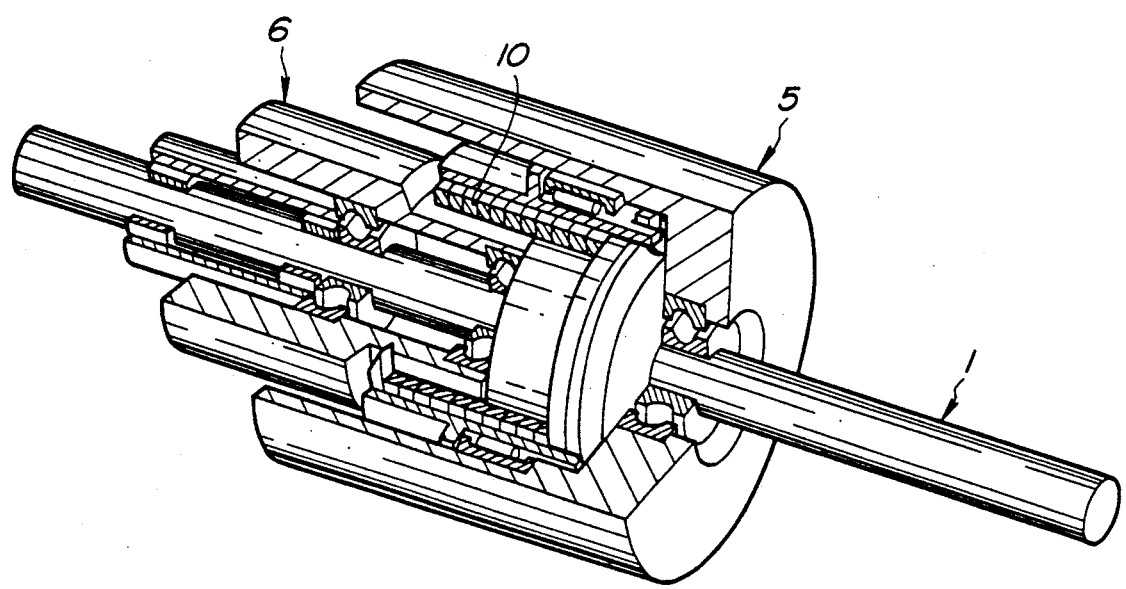
Figure 19:
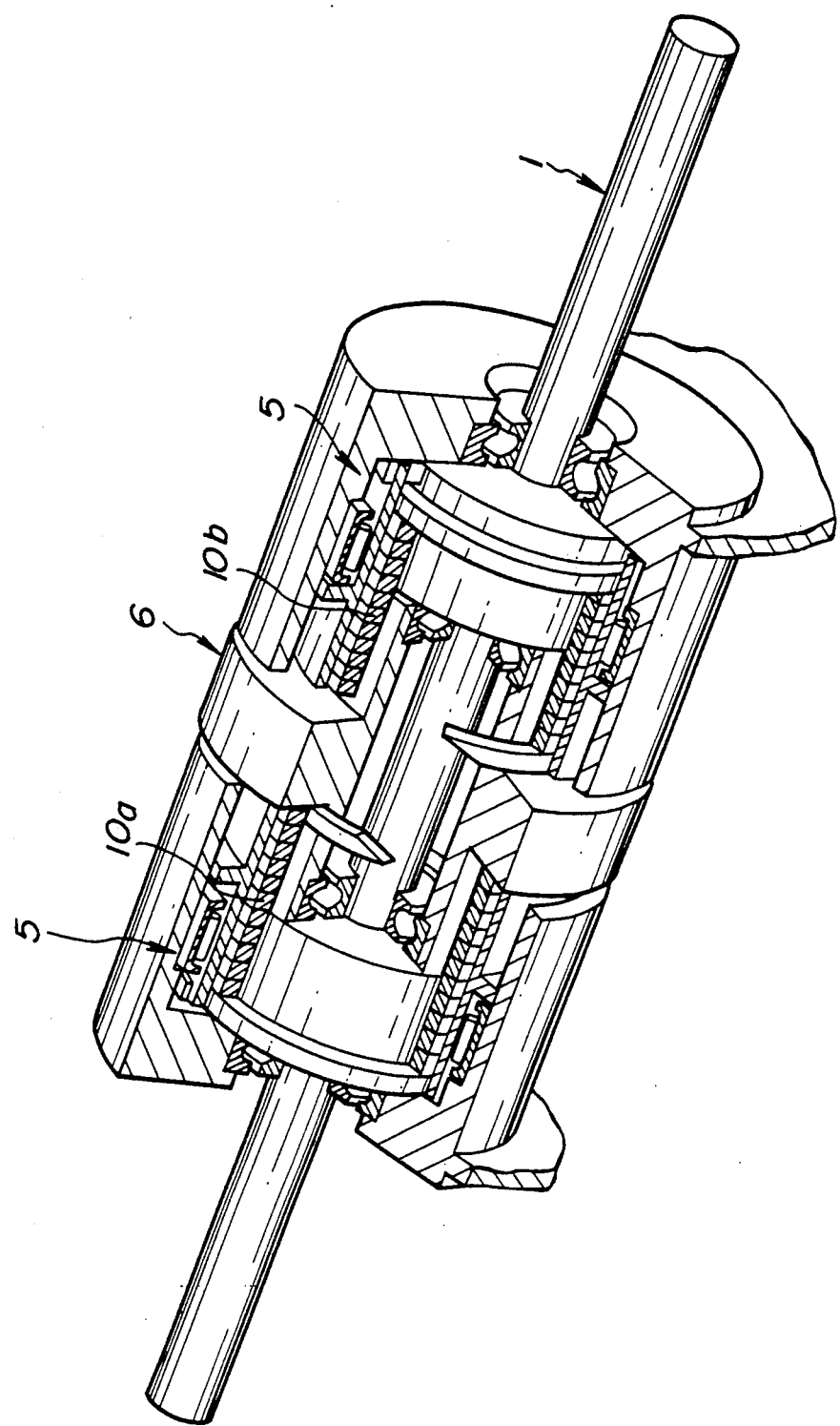

As shown in FIGS. 18 and 19, by extending brackets so as to cover coil springs, admission of foreign substances into contacting areas of the first and second rotatable members 1 and 6 can be avoided.

According to the above mentioned embodiments malfunctions, disadvantageous to the mechanism, which occur in the prior art will not occur in clutches according to the present invention. This results in greatly improved reliability of the clutches.

It should be understood that the invention is not limited to the particular embodiments shown and described herein, but that various changes and modifications may be made without departing from the sprit and scope of the invention as defined by the following claims.

What is claimed is:

1. A clutch comprising:
   a first rotatable member;
   a second rotatable member provided for rotational movement relative to said first rotatable member;
   engaging means for engaging between said first and second rotatable members, said engaging means including a coil spring wound over said first and second rotatable members, the coil spring being deformed according to rotation of said second rotatable member in one direction so as to be reduced in diameter so as to fasten together said first and second rotatable members to form a connection therebetween; and
   means including a third rotatable member connected to a part of said coil spring and a one-way brake element disposed between the third rotatable member and the first rotatable member, the one-way brake element allowing said third rotatable member to rotate in a release direction of said coil spring and preventing the third rotatable member from rotating in a winding direction of said coil spring to allow said first rotatable member to rotate independently of said second rotatable member.

2. A clutch as set forth in claim 1, further comprising a second one-way brake element which is disposed between said coil spring and said second rotatable member, said second one-way brake element allowing said second rotatable member to rotate independently of said coil spring when said second rotatable member rotates in one direction and, said second one-way brake element rotates said coil spring dependent on the rotation of said second rotatable member to engage between said first and said second rotatable members so that said first rotatable member rotates synchronously according to the rotation of said second rotatable member in the other direction.

3. A clutch comprising:
a first rotatable member including a shaft, first and second radially extending discs located on said shaft across a given gap;
a said second rotatable member provided for rotational movement relative to said first rotatable member including a hollow cylinder disposed between said first and said second discs so as to surround said shaft;
engaging means including a first coil spring wound around said first disc and said hollow cylinder, said first coil spring contracting so as to establish engagement between said first and second rotatable members according to rotation of said second rotatable member in one direction and a second coil spring wound around said second disc and said hollow cylinder, said second coil spring contracting so as to establish engagement between said first and second rotatable members according to rotation of said second rotatable member in the other direction; and
means responsive to the rotation of said first rotatable member for allowing one of said first and said second coil springs to be spread and preventing the other of said first and said second coil springs from contracting so as to allow said first rotatable member to rotate independently of said second rotatable member.

4. A clutch as set forth in claim 3, wherein said controlling means includes a first rotatable assembly including a third rotatable member connected to a part of said first coil spring and a first one-way brake element disposed between the third rotatable member and the shaft of said first rotatable member and a second rotatable assembly including a fourth rotatable member connected to a part of said second coil spring and a second one-way brake element disposed between the fourth rotatable member and the shaft of said first rotatable member, the first brake element allowing the third rotatable member to rotate in a release direction of the first coil spring and the second brake element preventing the fourth rotatable member from rotating in a winding direction of the second coil spring relative to the rotation of said first rotatable member in one direction, the first brake element preventing the third rotatable member from rotating in the winding direction of the second coil spring and the fourth rotatable member to rotate in the release direction of the second coil spring relative to the rotation of said first rotatable member in the other direction.

5. A clutch as set forth in claim 4, wherein said engaging means further includes a third one-way brake element disposed between said first coil spring and said second rotatable member and a fourth one-way brake element disposed between said second coil spring and said second rotatable member, said third one-way brake element allowing said second rotatable member to rotate independently of said first coil spring while said fourth one-way brake element rotates said second coil spring to cause said first rotatable member to rotate synchronously with said second rotatable member according to rotation of said second rotatable member in said one direction, said fourth one-way brake element allowing said second rotatable member to rotate independently of said second coil spring and said third one-way brake element rotates said first coil spring to cause said first rotatable member to rotate synchronously with said second rotatable member according to rotation of said second rotatable member in said other direction.

6. A clutch comprising:
a first rotatable member;
a second rotatable member provided for rotational movement relative to said first rotatable member;
a coil spring wound over said first and said second rotatable members;
rotation control means attached to a part of said coil spring, said rotation control means rotating so as to spread said coil spring according to rotation of said first rotatable member in one direction and being locked so as to prevent said coil spring from rotating in the winding direction according to rotation of said first rotatable member in the other direction; wherein
said rotation control means includes a third rotatable member connected to said part of said coil spring and a one-way brake element, said one-way brake element allowing said third rotatable member to rotate in the release direction of said coil spring according to rotation of said first rotatable member in one direction to cause said coil spring to be spread and preventing said third rotatable member from rotating in the winding direction of said coil spring to restrict said coil spring from contracting according to the rotation of said first rotatable member in the other direction.

7. A clutch comprising:
a first rotatable member;
a second rotatable member provided for rotational movement relative to said first rotatable member;
a coil spring wound over said first and said second rotatable members;
rotation control means attached to a part of said coil spring, said rotation control means rotating so as to spread said coil spring according to rotation of said first rotatable member in one direction and being locked so as to prevent said coil spring from rotating in the winding direction according to rotation of said first rotatable member in the other direction; wherein
said first rotatable member includes a shaft, first and second radially extending discs located on said shaft across a given gap, said second rotatable member including a hollow cylinder disposed between said first and said second discs so as to surround said shaft, said coil spring including a first coil spring wound around said first disc and said hollow cylinder to engage therebetween according to rotation of said second rotatable member in one direction and a second coil spring wound around said second disc and said hollow cylinder to engage therebetween according to rotation of said second rotatable member in the other direction, said rotation control means allowing one of said first and said second coil spring to be spread and prevent the other of said first and said second coils springs from being reduced in diameter according to rotation of said first rotatable member.

8. A clutch comprising:
a first rotatable member;
a second rotatable member provided for rotational movement relative to said first rotatable member;
engaging means including a coil spring wound over said first and said second rotatable members for engaging therebetween, said coil spring being responsive to rotation of said first rotatable member in a first direction to contract so as to establish tight engagement between said first and second rotatable members to transmit torque caused by the rotation of said first rotatable member to said second rotatable member and being responsive to rotation of the first rotatable member in a second direction opposite the first direction to spread the coil in a release direction so as to allow the first rotatable member to rotate independently of said second rotatable member to arrest transmission of torque to said second rotatable member; and
means responsive to rotation of said second rotatable member in the first direction for preventing the coil spring from contracting and responsive to rotation of said second rotatable member in the second direction for allowing the coil spring to be spread in the release direction to arrest transmission of torque caused by the rotation of said second rotatable member to said first rotatable member.

9. A clutch as set forth in claim 8, further comprising a second one-way clutch which is disposed between said coil spring and said second rotatable member, said second one-way clutch allowing said second rotatable member to rotate independently of said coil spring when said second rotatable member rotates in one direction and said one-way clutch rotating said coil spring dependent on the rotation of said second rotatable member to engage between said first and said second rotatable members so that said first rotatable member rotates synchronously according to the rotation of said second rotatable member in the other direction.

10. A clutch as set forth in claim 8, wherein said rotation control means includes a first rotatable assembly including a third rotatable member connected to a part of said first coil spring and a first one-way clutch and a second rotatable assembly including a fourth rotatable member connected to a part of said second coil spring and a second one-way clutch, said first rotatable assembly allowing said first coil spring to rotate in the release direction thereof and said second rotatable assembly preventing said second coil spring from rotating in the winding direction thereof according to the rotation of said first rotatable member in one direction, said first rotatable assembly preventing said first coil spring from rotating in the winding direction thereof and said second rotatable assembly allowing said second coil spring to rotate in the release direction thereof according to the rotation of said first rotatable member in the other direction.

11. A clutch as set forth in claim 8, further comprising a third one-way clutch disposed between said first coil spring and said second rotatable member and a fourth one-way clutch disposed between said second coil spring and said second rotatable member, said third one-way clutch allowing said second rotatable member to rotate independently of said first coil spring while said fourth one-way clutch locks said second rotatable member to said second coil spring so as to allow said second coil spring to rotate in the winding direction thereof to cause said second rotatable member to be connected to said first rotatable members according to rotation of said second rotatable member in one direction, said fourth one-way clutch allowing said second rotatable member to rotate independently of said second coil spring while said third one-way clutch locks said first coil spring to connect said second rotatable member to said first rotatable member according to rotation of said second rotatable member in the other direction.

12. A clutch as set forth in claim 8, wherein said means includes one-way brake means connected to a part of the coil spring, the one-way brake means being responsive to rotation of said second rotatable member to allow rotation of the coil spring, when fully wound, in a winding direction thereof and to allow the second rotatable member to rotate in a release direction of the coil spring to rotate said second rotatable member independently of said first rotatable member.

13. A clutch as set forth in claim 12, further comprising second one-way brake means disposed between the coil spring and the first rotatable member, the second one-way brake means being responsive to the rotation of said first rotatable member in the winding direction of the coil spring to allow the coil spring to contract for establishing the tight engagement between said first and said second rotatable members and being responsive to the rotation of said first rotatable member in the release direction of the coil spring to allow the first rotatable member to rotate independently of the coil spring to prevent the torque caused by the rotation of said first rotatable member from being transmitted to said second rotatable member.

14. A clutch comprising:
a first rotatable member;
a second rotatable member covering said first rotatable member, said first and second rotatable members being rotatably movable relative to each other;
engaging means for engaging between said first and second rotatable members, said engaging means including a first coil spring wound over a first section of said first rotatable member and said second rotatable member and a second coil spring wound over a second section of said first rotatable member and said second rotatable member, the first coil spring being responsive to rotation of said second rotatable member in a first direction to contract so as to establish tight engagement between said first and second rotatable members to transmit torque caused by the rotation of said second rotatable member to said first rotatable member and responsive to rotation of said second rotatable member in a second direction opposite the first direction to spread in a release direction so as to allow the second rotatable member to rotate independently of said first rotatable member to arrest transmission of torque caused by rotation of said second rotatable member to said first rotatable member, the second coil spring being responsive to rotation of said second rotatable member in the second direction to contract so as to establish tight engagement between said first and second rotatable members to transmit torque caused by the rotation of said second rotatable member to said first rotatable member and responsive to rotation of said second rotatable member in the first direction to spread in a release direction so as to allow the second rotatable member to rotate independently of said first rotatable member to arrest the transmission of torque to said first rotatable member; and means responsive to rotation of said first rotatable member in the first direction for preventing the first coil spring from being contracted and allowing the second coil spring to spread in the release direction and responsive to rotation of said first rotatable member in the second direction for allowing the first coil spring to spread in the release direction and preventing the second coil spring from being contracted to arrest transmission of torque caused by the rotation of said first rotatable member in the first and second directions to said second rotatable member.

15. A clutch as set forth in claim 14, wherein said means includes a first rotatable assembly including a third rotatable member connected to a part of said first coil spring and first one-way brake element disposed between the third rotatable member and said first rotatable member and a second rotatable assembly including a fourth rotatable member connected to a part of said second coil spring and a second one-way brake element disposed between the fourth rotatable member and said first rotatable member, the first brake element allowing the third rotatable member to rotate in a release direction of the first coil spring and the second brake element preventing the fourth rotatable member from rotating in a winding direction of the second coil spring relative to the rotation of said first rotatable member in one direction, the first brake element preventing the third rotatable member from rotating in the winding direction of the second coil spring and the second brake element allowing the fourth rotatable member to rotate in the release direction of the second coil spring relative to the rotation of said first rotatable member in another direction opposite the one direction.

16. A clutch as set forth in claim 15, further comprising a third rotatable assembly which includes a fifth rotatable member engaging with the first coil spring and a third one-way brake element disposed between the fifth rotatable member and said second rotatable member and a fourth rotatable assembly which includes a sixth rotatable member engaging with the second coil spring and a fourth one-way brake element disposed between the sixth rotatable member and said second rotatable member, the third rotatable assembly being responsive to the rotation of said second rotatable member in the winding direction of the first coil spring to lock the first coil spring to said second rotatable member to establish the tight engagement between said first and second rotatable members and being responsive to the rotation of said second rotatable member in the release direction of the first coil spring to allow the second rotatable member to rotate independently of the first coil spring to prevent the torque caused by the rotation of said second rotatable member from being transmitted to said first rotatable member, the fourth rotatable assembly being responsive to the rotation of said second rotatable member in the winding direction of the second coil spring to lock the second coil spring to said second rotatable member to establish the tight engagement between said first and second rotatable members and being responsive to the rotation of said second rotatable member in the release direction of the second coil spring to allow the second rotatable member to rotate independently of the second coil spring to prevent the torque caused by the rotation of said second rotatable member from being transmitted to said first rotatable member.

* * * * *